(12) United States Patent
Desberg

(10) Patent No.: US 9,387,901 B2
(45) Date of Patent: Jul. 12, 2016

(54) SCOOTER WITH REMOVABLE TOY

(71) Applicant: RAZOR USA LLC, Cerritos, CA (US)

(72) Inventor: Ian Desberg, Cerritos, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 14/885,159

(22) Filed: Oct. 16, 2015

(65) Prior Publication Data

US 2016/0144287 A1    May 26, 2016

Related U.S. Application Data

(63) Continuation of application No. 14/067,763, filed on Oct. 30, 2013, now Pat. No. 9,162,724.

(51) Int. Cl.
*B62M 1/00* (2010.01)
*B62K 3/00* (2006.01)
*A63G 17/00* (2006.01)

(52) U.S. Cl.
CPC ............... *B62K 3/002* (2013.01); *A63G 17/00* (2013.01)

(58) Field of Classification Search
CPC .......... B62B 3/007; B62B 3/02; A63H 17/22; B62K 3/002; A63G 17/00; A63G 19/00; A63G 19/02
USPC .......... 280/87.041, 87.021, 87.01, 1.13, 1.16; 446/313, 366; 472/95
See application file for complete search history.

(56) References Cited

U.S. PATENT DOCUMENTS

| | | | |
|---|---|---|---|
| 2,351,510 A | 6/1944 | Harless | |
| 2,578,682 A | 12/1951 | Fernstrom | |
| 2,698,187 A | 12/1954 | Biro et al. | |
| 2,708,584 A | 5/1955 | Lohrey | |
| 2,723,128 A | 11/1955 | Kelly, Sr. et al. | |
| 2,866,649 A | 12/1958 | West, Jr. | |
| 2,940,755 A | 6/1960 | Pouder | |
| 3,511,520 A | 5/1970 | Dunlap | |
| 4,265,461 A | 5/1981 | Okubo | |
| 4,744,573 A | 5/1988 | Most | |
| 4,759,557 A * | 7/1988 | Kassai | A63G 19/18 280/1.14 |
| D298,930 S | 12/1988 | Most | |
| 5,211,075 A | 5/1993 | Martin-Rossman | |
| 5,697,621 A | 12/1997 | Nazarian | |
| 6,120,044 A | 9/2000 | Tsai | |
| 6,367,829 B1 | 4/2002 | Lee | |
| 6,866,275 B1 | 3/2005 | Puzey | |
| 7,222,866 B1 | 5/2007 | Cahoj | |
| 7,942,719 B2 | 5/2011 | Leynes | |
| 9,162,724 B2 * | 10/2015 | Desberg | A63G 17/00 |
| 2002/0180169 A1 | 12/2002 | Kwok | |

* cited by examiner

*Primary Examiner* — James M Dolak
(74) *Attorney, Agent, or Firm* — Knobbe, Martens, Olson & Bear LLP

(57) ABSTRACT

A scooter having a handlebar assembly that includes a vertical portion supporting a handlebar. The vertical portion includes an opening at its top end and the opening is configured to receive an elongate portion of a toy. The assembly also includes a ring portion at the opening of the vertical portion and the ring portion frictionally engages the elongate portion of the toy. The vertical portion and the ring portion are configured to securely support the elongate portion of the toy.

17 Claims, 5 Drawing Sheets

SCOOTER WITH REMOVABLE TOY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE DISCLOSURE

1. Field of the Invention

Embodiments of the invention relate generally to toys for vehicles and, more specifically, to a ridable vehicle that supports a removable stick toy.

2. Description of the Related Art

Riding on vehicles such as scooters is a popular recreational activity. Scooters have become popular among many age groups and there are many different scooter variations and scooter designs. Conventional scooters generally have at least two wheels and some type of steering mechanism. Other scooter designs include three or more wheels. Scooter designs have also become more compact and convenient. With the increase in scooter popularity, there has also been a significant increase in the demand for scooter accessories.

Often, it is desirable for a rider of a vehicle or scooter to transport a toy on a vehicle or attach a toy to the vehicle. However, some vehicles require a rider to use both hands to ride or steer the vehicle. Such vehicles often include baskets or other add-on structures for carrying additional items for the rider. Other embodiments require adhesive or more permanent components to attach a toy to the vehicle. It is generally desirable for the rider to transport a toy on a scooter without requiring the use of the rider's hands.

SUMMARY OF THE INVENTION

An aspect of the present invention involves the realization that it is also desirable to couple a toy to a scooter without the need for baskets or additional structures for securing the toy on the vehicle. Therefore, the current arrangements in the prior art for transporting a toy on a scooter are unsuitable.

Preferred embodiments of the present scooter are configured to allow a user to securely couple a toy to a scooter or ridable vehicle. A user can couple a toy to the scooter and transport the toy while at the same time steering and controlling the scooter. Furthermore, preferred embodiments allow the user to conveniently remove the toy from the scooter. Furthermore, preferred embodiments are configured so that the toy is proximate the hands of a user while the use is riding the scooter. In other preferred embodiments, the toy is held securely on the scooter and is restricted from falling out of its position on the scooter during regular riding of the scooter. Preferably, the handlebar assembly of the scooter securely engages the toy so as to restrict movement of the toy relative to the scooter under typical riding conditions.

A preferred embodiment is a toy combination including a scooter and a stick toy. The scooter includes a body having a deck and a footrest surface. A handlebar assembly is operably coupled to the body and includes a vertical member extending upward relative to the deck. The vertical member includes a top portion and a handlebar is supported by the vertical member. The handlebar includes grip portions that are accessible to a user riding on the scooter. The stick toy includes an elongate stick portion. The vertical member of the handlebar assembly includes an opening adjacent to the top portion of the vertical member. The opening is configured to receive the elongate stick portion of the toy so that the toy is selectively securely supported by the handlebar assembly.

In some configurations, the handlebar assembly includes a retention ring portion coupled to the vertical member adjacent the opening, and the retention ring portion is configured to frictionally engage the elongate stick portion of the toy. The retention ring portion can include at least one protruding member extending inward from an inner surface of the retention ring portion, and the at least one protruding member frictionally engages the elongate stick portion of the toy when the elongate stick portion is received within the opening.

In some configurations, the handlebar is supported by the vertical member at a position in front of the vertical member.

In some configurations, the vertical member is a hollow tube having an inner surface that is sized and shaped to receive the elongate stick portion of the toy. A cross-section of the inner surface of the vertical member can be circular. The hollow tube can be longer than the elongate stick portion of the toy.

An embodiment involves a scooter that has a body having a deck and a footrest surface. The scooter also includes at least one front wheel and a rear wheel supported by the body. A handlebar assembly is coupled to the body and extends upward from the body. The handlebar assembly has a vertical member and a handlebar supported by the vertical member. The handlebar includes grip portions accessible to a user riding the scooter. The vertical member includes an upper portion that includes an opening, which is sized and shaped to receive an elongate stick portion of a stick toy so that the stick toy is supported by the handlebar assembly.

In some configurations, the vertical member is hollow and receives the elongate stick portion of the toy when the elongate stick portion is passed through the opening. The vertical member and the elongate stick portion can each be cylindrical in shape.

In some configurations, the handlebar assembly includes a cap portion coupled to the vertical member adjacent the opening, the cap portion having a hole through which the elongate stick member of the stick toy is passed. The cap portion can be sized and shaped to frictionally engage the elongate stick member of the stick toy when it is passed through the hole and into the opening. The cap portion can include one or more flap portions.

In some configurations, the handlebar is coupled to the vertical member at a position below the opening.

An embodiment involves a scooter that includes a body having a deck and a foot rest surface. The body also has a front portion and a rear portion. A pair of front wheels is rotatably supported by the front portion of the body. A rear wheel is rotatably supported by the rear portion of the body. A handlebar assembly is supported by the front portion of the body. The handlebar assembly includes a handlebar supported by a vertical tube. A stick toy has an elongate stick member and a head portion. The vertical tube includes a top portion that is open and the elongate stick member of the stick toy is selectively received into the open top portion of the vertical tube so that the elongate stick member is stowed within the tube.

In some configurations, the handlebar assembly includes a retention ring portion coupled to the top portion of the vertical tube, and the retention ring portion frictionally engages the elongate stick member when the elongate member is received into the vertical tube. The retention ring portion can include multiple flap portions that frictionally engage the elongate stick member.

In some configurations, the handlebar is coupled to the vertical tube forward of and below the open top portion.

BRIEF DESCRIPTION OF THE DRAWINGS

These and other features, aspects, and advantages of the present invention are described below with reference to drawings of a preferred embodiment, which is intended to illustrate, but not to limit, the present invention. The drawings contain five figures.

DETAILED DESCRIPTION OF THE PREFERRED EMBODIMENTS

In the following detailed description, terms of orientation such as "top", "bottom", "upward", "downward", "lower", "front", "frontward", "rear", "rearward", and "end" are used to simplify the description of the context of the illustrated embodiments. Likewise, terms of sequence, such as "first" and "second", are used to simplify the description of the illustrated embodiments. However, other orientation and sequences are possible, and the present invention should not be limited to the illustrated orientation(s). Those skilled in the art will appreciate that other orientations of the various components are possible.

For the purposes of this disclosure, embodiments of personal mobility vehicles will be referred to as "scooters", but it will be understood by those with ordinary skill in the art that the present invention extends beyond the specifically disclosed embodiments and references to scooters to other alternative embodiments and/or uses of the invention and modifications and equivalents thereof. In particular, while the present systems and methods have been described in the context of particularly preferred embodiments as it relates to scooters, the skilled artisan will appreciate, in view of the present disclosure, that certain advantages, features and aspects of the systems and methods may be realized in a variety of other applications, including personal mobility vehicles other than scooters with different arrangements of front and rear wheels.

In a preferred embodiment, a scooter includes a body having a deck and a footrest portion. The body supports a handlebar assembly that is configured to support a toy. Preferably the handlebar assembly includes a vertical portion that receives an elongate portion of a toy. In some embodiments, the vertical portion includes an opening that receives an elongate portion of a toy. Preferably, the opening is configured to frictionally engage the elongate portion of a toy so that the movement of the toy relative to the vertical portion is restricted. In some embodiments, the vertical member includes a retention member or ring portion that is configured to frictionally engage the elongate portion of the toy and the ring portion can include protrusions or flaps that engage the elongate portion.

Figure 1:
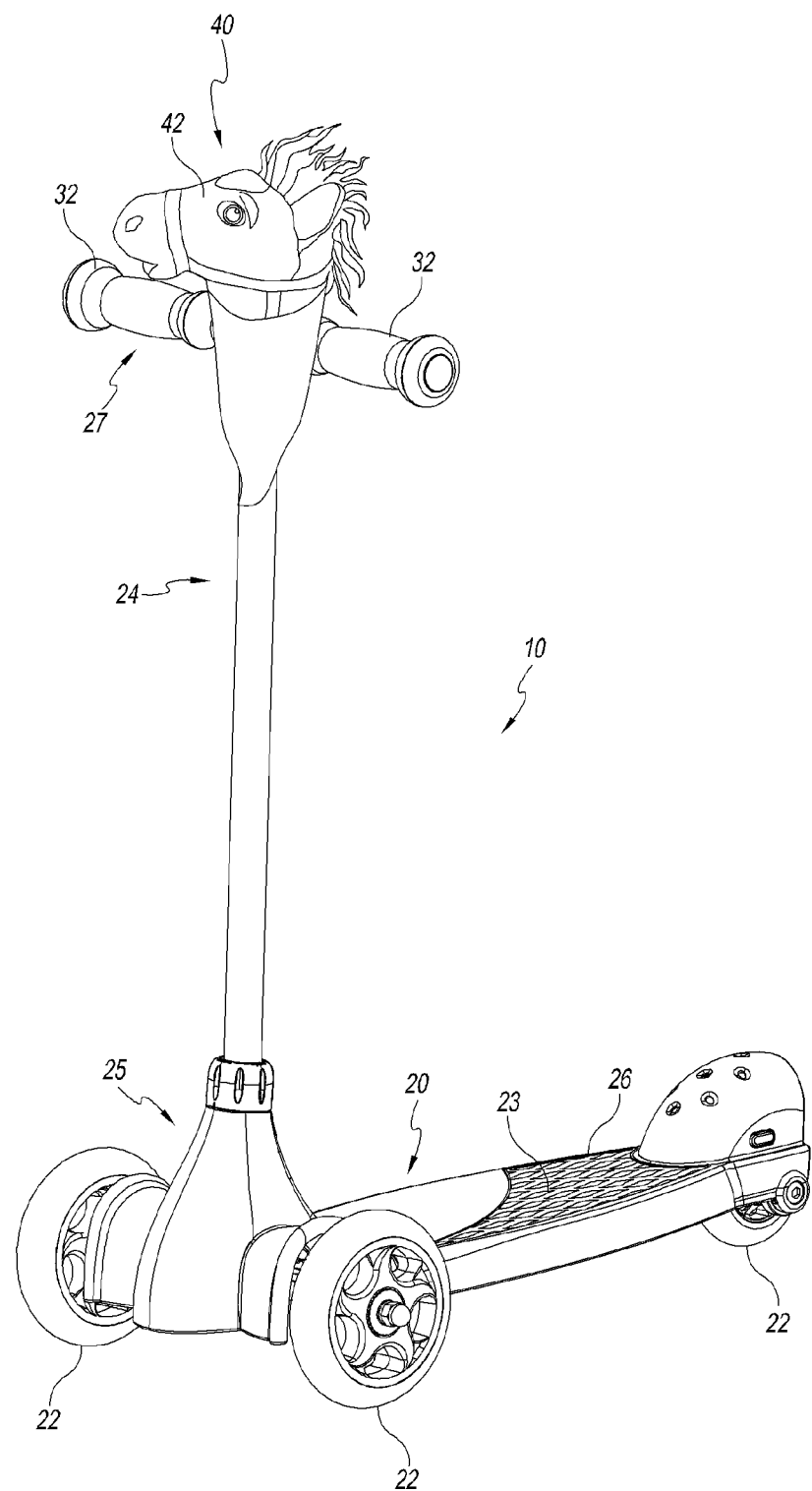
FIG. 1 is a perspective view of an embodiment of a scooter and a toy having certain features, aspects, and advantages of the present invention.

FIG. 1 illustrates a scooter 10 having certain features, aspects and advantages of the present invention. The scooter 10 includes a body 20, which includes a deck 26 and a handlebar assembly 24. Preferably, the upper surface of the deck 26 includes a foot rest surface 23 which is configured to support a foot or the feet of a user. The scooter 10 includes one or more wheels 22 supported by the body 20. The illustrated scooter includes wheels 22 spaced apart from one another with the deck 26 extending therebetween, such as a pair of front wheels spaced laterally from one another and at least one rear wheel spaced longitudinally from the front wheels. However, other numbers and arrangements of wheels can be provided, including but not limited to a single front wheel and a single rear wheel.

As illustrated, a preferred embodiment of the scooter 10 also includes a support portion 25 which supports the handlebar assembly 24 so that the handlebar assembly 24 extends upward from the deck 26. Preferably, a handlebar 27 is positioned at or near the top of the handlebar assembly 24. In one embodiment, the body 20 also includes one or more toy coupling portions configured to receive and preferably retain a portion of a toy 40 and couple the toy 40 to the scooter. In one embodiment, the scooter also includes a toy supported by the scooter, and a portion of which is received by a toy coupling portion of the scooter. In one embodiment, the toy is a stick toy (e.g., a stick horse) that includes an elongate portion that is received within a toy coupling portion on the scooter. Embodiments of the toy and the scooter that supports such toys are described below with reference to FIGS. 1 through 5. In the illustrated arrangements, the toy includes an elongate portion that is received within a corresponding void or opening on the scooter; however, arrangements in which the toy is coupled to other portions of the scooter are also possible. Preferably, each of the toy and the scooter has separate utility as a plaything, such that the toy and the scooter can be played with separately from one another. Preferably, the toy and the scooter also have utility as a combination. For example, the toy can add ornamental interest to the scooter when in the stowed position.

As described, FIG. 1 illustrates a preferred embodiment of the scooter 10 that includes the body 20, deck 26 and handlebar assembly 24. Preferably, the handlebar assembly 24 is configured to allow a rider to steer the scooter 10 by steering at least one of the wheels 22. However, the scooter 10 can have any suitable steering mechanism, such as the steering mechanism disclosed in U.S. Pat. No. 8,186,693 to Korschot, the entirety of which is hereby incorporated by reference herein. Alternatively, the steering mechanism can include one or more front wheels that is rotatable about a steering axis and controllable by the handlebar assembly 24.

In one embodiment, the handlebar assembly 24 includes a handlebar 27 with two grip portions 32. The scooter 10 also includes a toy 40 supported by the handlebar assembly 24 and adjacent the handlebar 27. In one embodiment, the toy 40 includes a top portion 42 that is the likeness of an animal head (e.g., a horse head, such that the toy 40 is a stick horse) or other type of head or toy feature. However, the top portion 42 can also be any type of toy or likeness.

Figure 2:
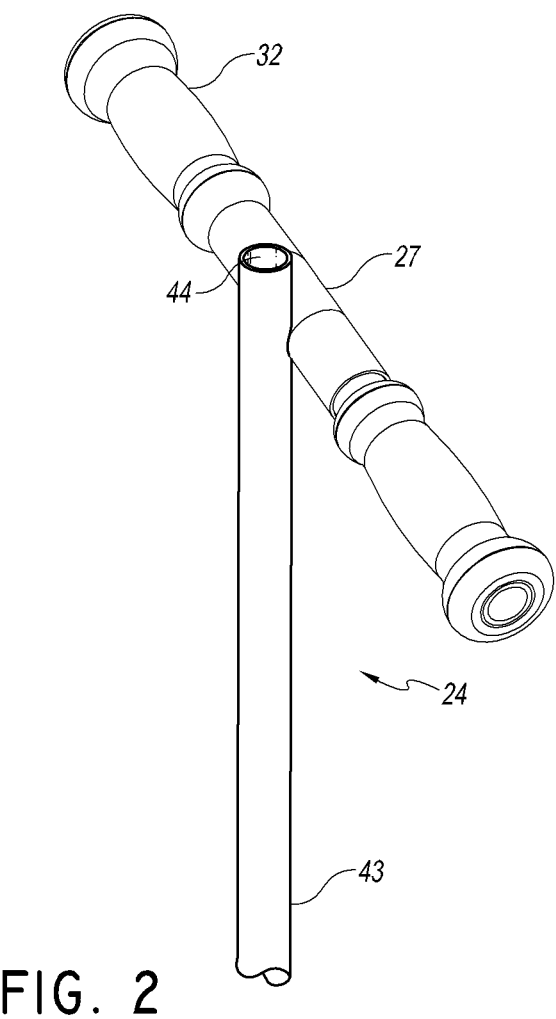
FIG. 2 is a perspective view of a handlebar assembly of the scooter of FIG. 1.

FIG. 2 illustrates an embodiment of the handlebar assembly 24 that includes a vertical member 43 supporting the handlebar 27. The handlebar 27 includes grips 32 and generally extends horizontally and perpendicular to the vertical member 43. The handlebar 27 can be coupled to the vertical member 43 at or adjacent the middle portion of the handlebar 27. Preferably, the vertical member 43 is configured to support a toy 40 and can at least substantially completely surround a stick portion of the toy 40 when the toy 40 is in a stowed position. In other embodiments, the handlebar 27 is configured to support the toy 40. As illustrated, the vertical member 43 includes an opening 44 and is configured to receive a portion of a toy. Preferably, the opening 44 is positioned at or near the top of the vertical member 43. However, in other embodiments the opening 44 is positioned along the sides of the vertical member 43 or near the bottom. In other embodiments, the opening 44 can be located on the handlebar 27. Alternatively, a separate member (not shown) can be coupled to the vertical member 43 or the handlebar 27 and can include an opening or receiving portion configured to receive a portion of a toy.

In some embodiments, the handlebar 27 is coupled to the vertical member 43 at a location forward of the opening 44. Preferably, the handlebar 27 is also coupled to the vertical member 43 at a position that is lower than the opening 44. In other embodiments, the handlebar 27 is coupled to the vertical member behind the opening 44. The handlebar 27 can also be supported by the vertical member 43 via a stem or other support member that couples the vertical member 43 to the handlebar 27 and positions the handlebar 27 away from the vertical member 43.

Figure 3:
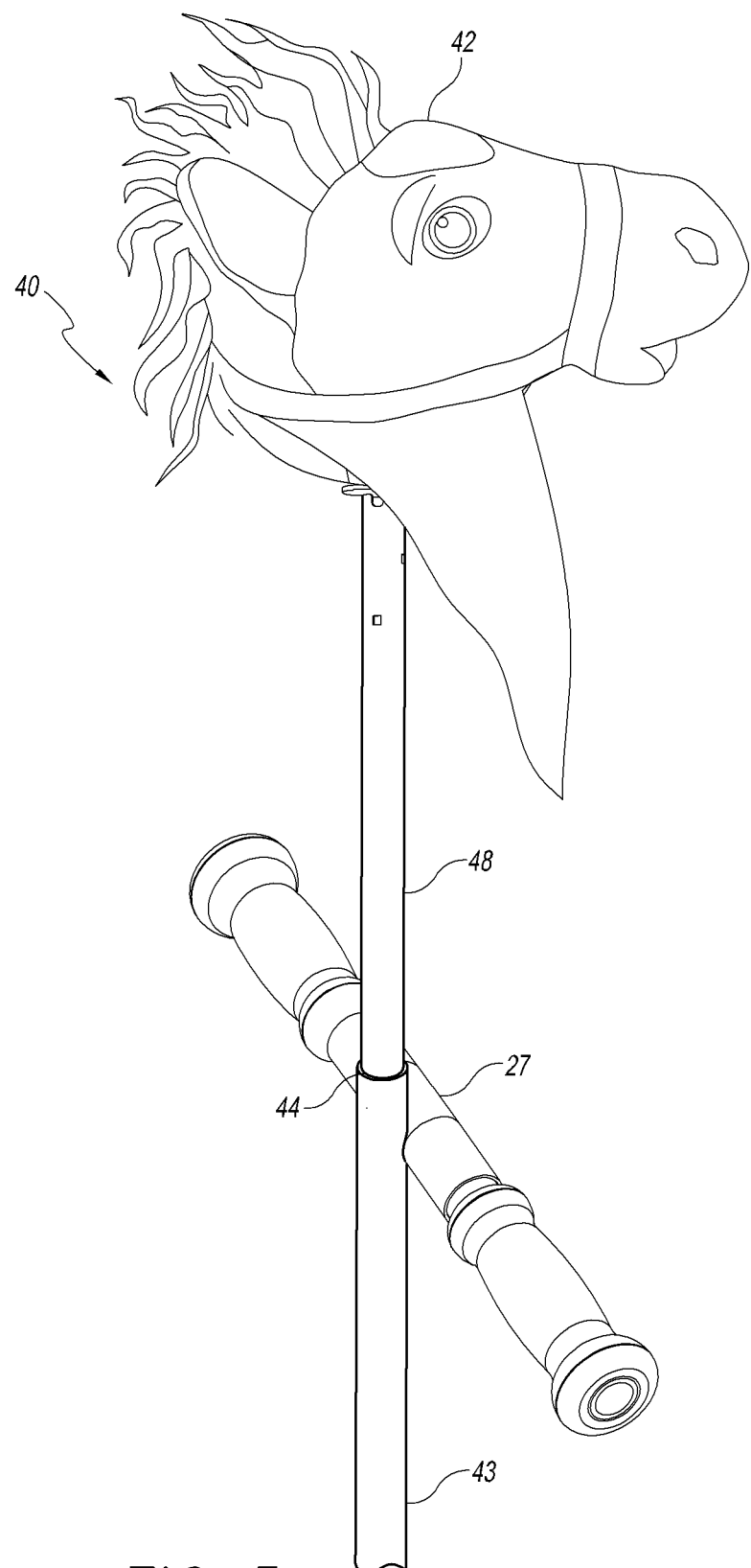
FIG. 3 is a perspective view of a handlebar assembly of the scooter of FIG. 1 and a toy.

As illustrated in FIG. 3, the vertical member 43 preferably supports a toy 40 so that a portion of the toy 40 extends above the vertical member 43 and/or above the handlebar 27. Preferably, the toy 40 includes a top portion 42 and an elongate member or stick 48 that extends downward from the top portion 42. Preferably, the elongate member 48 is slidably received into the opening 44. The elongate member 48 can also be slidably received and stowed within the vertical member 43 of the handlebar assembly 24. Preferably, the shape of the opening 44 corresponds to the size and shape of the cross-section of the elongate member 48. Also, the cross-section of the inner surface(s) of the vertical member 43 can be sized and shaped to correspond to the cross-section of the outer surface of the elongate member 48. As illustrated, the elongate member 48 is cylindrical, the opening 44 is circular, and the inner surface of the vertical member 43 is cylindrical or circular. Preferably, the cross-section of the inner surface of the vertical member 43 is only slightly larger than the cross-section of the elongate member 48. In other embodiments, the elongate member 48 and the vertical member 43 have cross-sections that are rectangular or polygon-shaped. The cross-sections can also be circular with one or more flats sides. In other arrangements, the elongate member 48 and the vertical member 43 can have compatible shapes that allow the elongate member 48 to be stowed within the vertical member 43 and which preferably inhibit substantial relative movement therebetween in directions perpendicular to a longitudinal axis.

Preferably, the toy 40 includes a stop portion (not shown) that contacts the handlebar assembly 24 when the elongate member 48 is fully received into vertical member 43. The stop portion can be configured to contact the opening 44 or top portion of the vertical member 43 so that it restricts movement of the toy 40 or elongate member 48 further downward into the opening 44. In some embodiments, the stop portion can be the bottom surface of the top portion 42 of the toy 40. In other embodiments, the stop portion can be coupled to or part of the elongate member 48. Alternatively, the top portion 42 of the toy 40 can rest on the opening 44 or handlebar 27 when the elongate member 48 is inserted into the vertical member 43.

As illustrated, in some embodiments, the handlebar 27 is supported by the vertical member 43 at a position forward of the opening 44. The toy 40 preferably is received into the opening 44 at a location behind the handlebar 27 so that at least a portion of the toy 40 extends behind the handlebar 27 and closer to a user riding the scooter 10. In some embodiments, the handlebar 27 is configured to allow the elongate portion 48 to pass through a cut-out or other opening in the handlebar 27. Preferably, the handlebar 27 is coupled to the vertical member 43 at a location below the top of the opening 44. In some embodiments, the handlebar 27 is coupled to the vertical member 43 by a bracket or other coupling member. Preferably, the elongate member 48 can rotate within the opening 44 and vertical member 43 so that the top portion 42 of the toy 40 can rotate relative to the handlebar assembly 24. Preferably, the top portion 42 can rotate 360 degrees relative to the handlebar assembly 24 with the elongate member 48 inserted into the vertical member 43.

Figure 4:
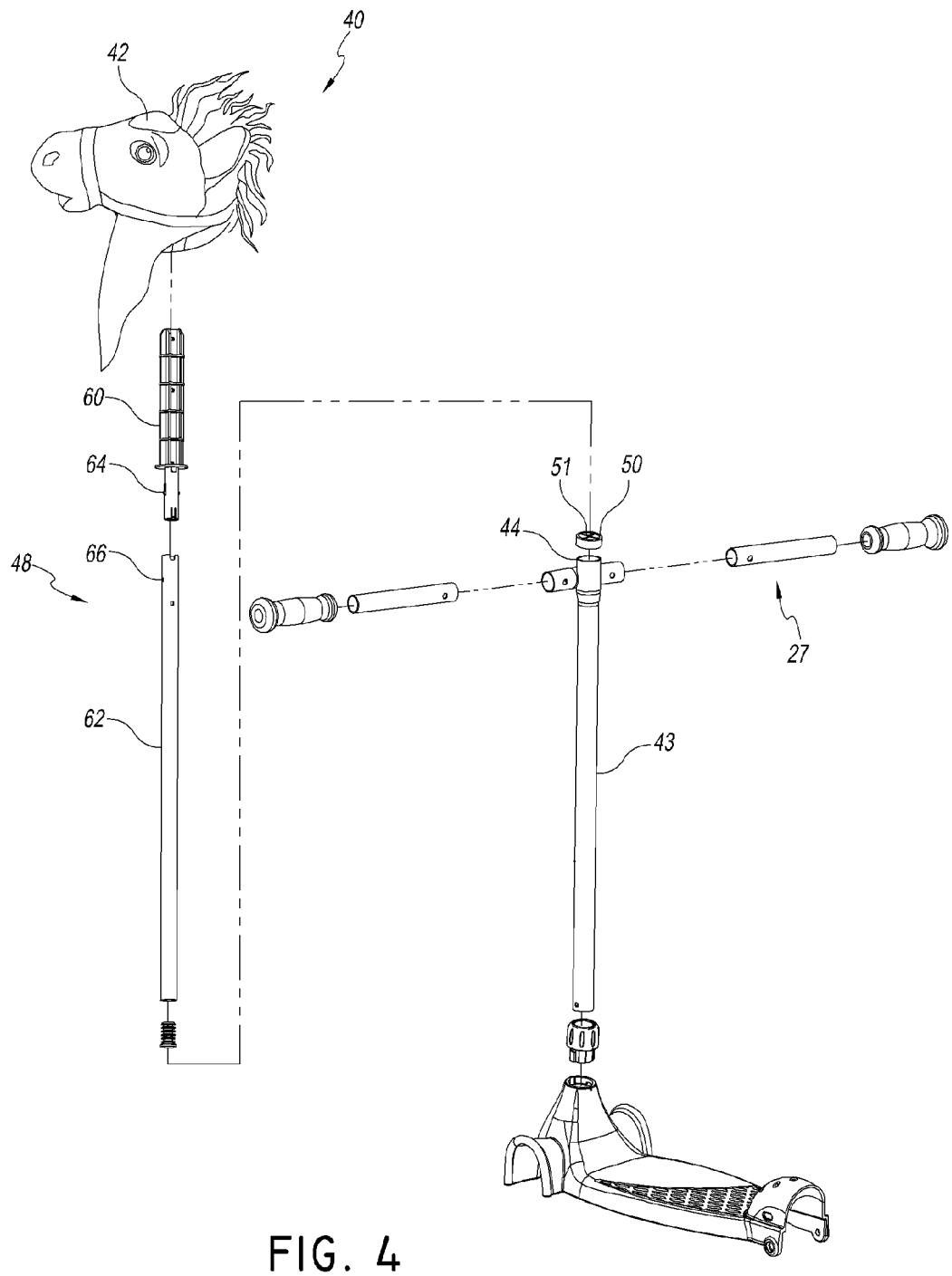
FIG. 4 illustrates an exploded view of an embodiment of a handlebar assembly and a toy.

FIG. 4 illustrates an exploded view of the handlebar assembly 24 and toy 40. In some embodiments, the toy 40 includes more than one removable portion. As illustrated, the toy 40 includes a top portion 42 and an elongate member 48 that includes a first member 60 and a second member 62. Preferably, the first member 60 is removably coupled to the top portion 42 and a portion of the first member 60 is received within the top portion 42. The first member 60 is also removably coupled to the second member 62. Preferably, a portion of the first member 60 is received within the second member 62. Preferably, the first member 60 includes one or more pins 64 protruding outward from the surface of the first member 60. The second member 62 can include one or more voids or openings 66. When a portion of the first member 60 is received into the second member 62, the one or more pins 64 engage the one or more voids 66 and a portion of the one or more pins 64 enters into the one or move voids 66 to restrict movement of the first member 60 relative to the second member 62. Preferably, the one or more pins 64 (e.g., biased push pins) can be selectively removed from the one or more voids 66, and the first member 60 can be removed from the second member 62.

Figure 5:
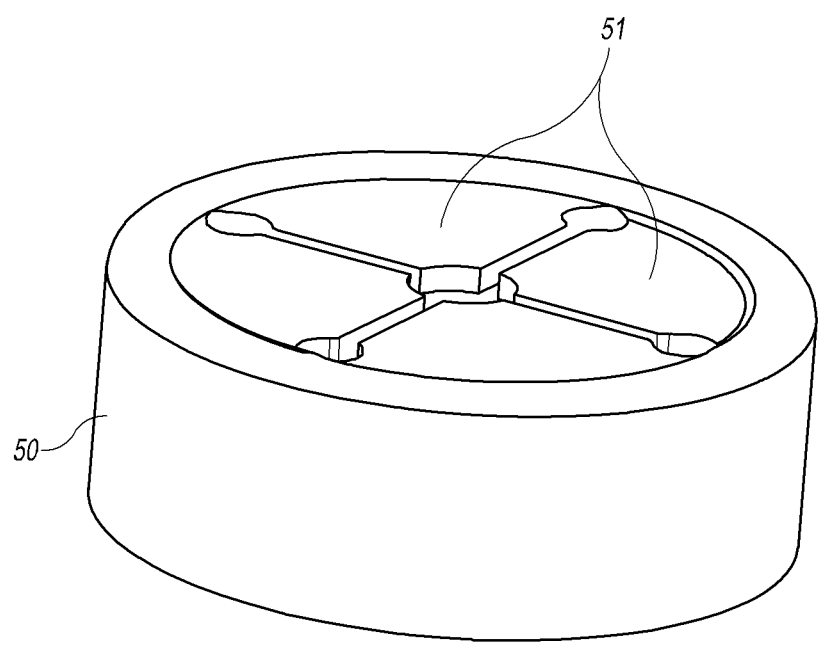
FIG. 5 illustrates an embodiment of the ring portion of the handlebar assembly of FIG. 4.

In one embodiment, the handlebar assembly 27 includes a gripper, retention member or friction ring 50 located adjacent the opening 44 and configured to engage the elongate member 48 of the toy 40. The ring 50 can be removable from the handlebar assembly 24 and is preferably coupled to the top of the vertical member 43 adjacent the opening 44. Preferably, the ring 50 is configured to frictionally engage the elongate member 48 of the toy 40 when the elongate member 48 is inserted into the opening 44. In one embodiment, the ring 50 includes flaps or protrusions 51 that extend inward from the outer edge of the ring 50. FIG. 5 illustrates an embodiment of a ring 50 that includes protrusions 51 and is configured to be coupled to a vertical member 43. The protrusions or flaps 51 can be configured to provide frictional contact with the elongate member 48 to restrict movement of the elongate member 48 within the opening 44 and the vertical member 43. This is beneficial because the elongate member 48 can be held in position within the opening 44 or vertical member 43 so that undesired movement of the toy 40 relative to the handlebar assembly 24 is limited when the handlebar assembly 24 is subjected to outside forces. For example, the ring 50 preferably applies a force to the elongate member 48 sufficient to retain the elongate member 48 within the opening 44 and vertical member 43 when the scooter is subjected to bumps or other normal riding conditions. The ring 50 can also be configured to apply a frictional force to the elongate member 48 sufficient to control the speed at which the elongate member 48 is inserted into or removed from the opening 44. This can provide more control to the rider and can protect the toy 40 from being damaged during insertion or removal from the scooter.

Although the embodiments of the invention presented herein have been disclosed in the context of certain preferred embodiments and examples, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular embodiments described above, but should be determined only by a fair reading of the claims that follow.

The invention claimed is:

1. A scooter, comprising:
a body having a deck, an upper surface of the deck comprising a support surface;
a pair of front wheels spaced laterally apart from one another and connected to the body;
at least one rear wheel spaced longitudinally from the pair of front wheels and connected to the body;
a handlebar assembly rotatably connected to the body, the handlebar assembly comprising:
a vertical member extending upward relative to the deck, the vertical member including a frictional coupling portion and an opening adjacent the frictional coupling portion; and
a handlebar connected to vertical member, the handlebar including grip portions configured to be gripped by a user to rotate the handlebar assembly;
a toy having an elongate portion and a toy portion supported by the elongate portion;
wherein the opening is configured to receive the elongate portion of the toy such that a portion of the toy extends above the handlebar and the toy is separate and removable from the handlebar and the frictional coupling portion frictionally engages an outside surface of the elongate portion of the toy.

2. The scooter of claim 1, wherein the coupling portion includes at least one protruding member extending inward from an inner surface of the coupling portion, and the at least one protruding member frictionally engages the elongate portion of the toy when the elongate portion is received within the opening.

3. The scooter of claim 1, wherein the vertical member is a hollow tube having an inner surface that is sized and shaped to receive the elongate portion of the toy.

4. The scooter of claim 3, wherein a cross-section of the inner surface of the vertical member is circular.

5. The scooter of claim 4, wherein the hollow tube is longer than the elongate portion of the toy.

6. A ridable vehicle comprising:
a body having a deck and a support surface;
at least one front wheel and a rear wheel connected to the body;
a handlebar assembly connected to the body and extending upward from the deck, the handlebar assembly having a vertical member and a handlebar supported by the vertical member, the handlebar including grip portions configured to be gripped by a user;
wherein the vertical member includes an upper portion that includes an opening, the opening being configured to receive an elongate stick portion of a stick toy;
wherein the stick toy is separable from the handlebar; and
wherein the stick toy is not used for steering the vehicle.

7. The ridable vehicle of claim 6, wherein the vertical member is hollow and receives the elongate stick portion of the toy when the elongate stick portion is passed through the opening.

8. The ridable vehicle of claim 7, wherein the vertical member and the elongate stick portion are each cylindrical in shape.

9. The ridable vehicle of claim 6, wherein the handlebar assembly includes a cap portion connected to the vertical member adjacent the opening, the cap portion having a hole through which the elongate stick member of the stick toy is passed.

10. The ridable vehicle of claim 9, wherein the cap portion is sized and shaped to frictionally engage the elongate stick member of the stick toy when it is passed through the hole and into the opening.

11. The ridable vehicle of claim 10, wherein the cap portion includes one or more flap portions.

12. The ridable vehicle of claim 6, wherein the handlebar is connected to the vertical member at a position below the opening.

13. A scooter, comprising:
a body having a deck, the deck having an upper surface comprising a support surface;
a handlebar assembly rotatably connected to the body, the handlebar assembly comprising:
a vertical member extending upward relative to the deck, the vertical member including an upper portion, a retention member, and an opening adjacent the upper portion; and
a handlebar connected to vertical member, the handlebar including grip portions accessible to a user to rotate the handlebar assembly;
a toy having an elongate portion and a toy portion supported by the elongate portion;
wherein the opening is configured to receive the elongate portion of the toy such that a portion of the toy is received inside the elongate portion and another portion of the toy extends above the handlebar;
wherein the toy is separate and removable from the handlebar; and
wherein the retention member is configured to frictionally engage an outside surface of the elongate portion of the toy to inhibit longitudinal and rotational movement of the elongate portion within the opening.

14. The scooter of claim 13, wherein the retention member includes at least one protruding member extending inward from an inner surface of the retention member, and the at least one protruding member frictionally engages the elongate portion of the toy when the elongate portion is received within the opening.

15. The scooter of claim 13, wherein the vertical member is a hollow tube having an inner surface that is sized and shaped to receive the elongate portion of the toy.

16. The scooter of claim 13, wherein a cross-section of the inner surface of the vertical member is circular.

17. The scooter of claim 15, wherein the hollow tube is longer than the elongate portion of the toy.

* * * * *